United States Patent [19]

Stevens

[11] Patent Number: 4,489,916
[45] Date of Patent: Dec. 25, 1984

[54] VALVE AND STEM SEAL THEREFOR

[75] Inventor: Russell E. Stevens, Houston, Tex.

[73] Assignee: Cameron Iron Works, Inc., Houston, Tex.

[21] Appl. No.: 366,367

[22] Filed: Apr. 7, 1982

[51] Int. Cl.³ .............................................. F16K 41/04
[52] U.S. Cl. ..................................... 251/214; 277/112; 277/116.6; 277/117; 277/121; 277/125
[58] Field of Search ............ 251/214; 277/112, 116.6, 277/117, 121, 123, 125

[56] References Cited

U.S. PATENT DOCUMENTS

| | | | |
|---|---|---|---|
| 1,693,039 | 11/1928 | Minor | 277/112 |
| 2,586,871 | 2/1952 | Shields | 277/112 |
| 3,071,344 | 1/1963 | Banks | 251/214 |
| 3,492,009 | 1/1970 | Beresnev et al. | 277/112 |
| 4,299,395 | 11/1981 | Reed | 277/112 |
| 4,349,205 | 9/1982 | McGee et al. | 277/117 |

FOREIGN PATENT DOCUMENTS

WO81/02454  9/1981  PCT Int'l Appl. ................. 251/214

Primary Examiner—George L. Walton
Attorney, Agent, or Firm—Vinson & Elkins

[57] ABSTRACT

An improved valve having a body with an inlet, an outlet, a valve chamber, a valve seat, a valve member movable in the valve chamber toward and away from said valve seat, a stem connected to said valve member a bonnet connected to and forming a part of the body a part of the body in the stem extending therethrough and an improved sealing assembly for sealing around the stem including a seal ring of extrudable material and means providing a space into which said seal ring extrudes to form a sealing lip extending toward the pressure and responsive to pressure exerted on the sealing assembly. Also the improved sealing assembly includes mating tapered wedging and seal rings having a small angle mating taper wedge the rings into sealing engagement with the walls against which they are to seal.

12 Claims, 6 Drawing Figures 4,489,916

VALVE AND STEM SEAL THEREFOR

BACKGROUND

Valves, such as gate valves, when subjected to extremes of service, such as high pressures (e.g. 30,000 psi), elevated temperature (e.g., 300° F.), cycling of the pressure and temperature, degrading fluids, and either reciprocation, rotation or both of the stem, experience frequent failure of the stem seal.

One effort to solve this problem is disclosed in U.S. Pat. No. 4,262,690 which suggests a packing assembly having a stack of packing rings formed of a material such as polytetrafluoroethylene with packing retainer rings on each side of each packing ring and metal chamfer rings on opposite sides of the assembly cammed against the stem and bonnet to prevent extrusion of the packing along the stem and bonnet.

Tapered expansion rings are used in U.S. Pat. No. 1,826,967 to maintain uniform packing loading when subjected to temperature changes. U.S. Pat. No. 4,288,082 uses a tapered surface to cam a metal seal ring into sealing engagement in the casing annulus of a well bore. U.S. Pat. No. 4,185,840 discloses a shaft seal including a stack of alternate elastomeric and rigid rings banded together with the elastomeric rings being progressively thinner in a direction away from the high pressure side of the seal to provide a uniform distribution or radial packing pressure along the length of the seal assembly.

U.S. Pat. No. 4,082,300 discloses a sealing assembly for a pump plunger for service in pumping corrosive liquids. The sealing assembly includes many types of metal, hard burned coal and flexible graphite rings.

SUMMARY

The present invention provides an improved valve and an improved stem seal. The valve has a body with an inlet, an outlet, a valve chamber and a valve seat, a valve member, a bonnet secured to the body and providing a closure for the valve chamber, a stem connected to the valve member and extending out through the bonnet; means for moving the valve stem and the valve member; and an improved seal assembly for sealing between the stem and the bonnet. The improved seal assembly has at least one seal ring and a back-up ring on both ends of the seal ring. The seal ring is made from an extrudable material and one of the back-up rings provide a recess adjacent the surfaces against which the seal ring is to seal so that when preloaded and subjected to pressure the seal rings extrude into the recesses to form sealing lips for sealing against the surfaces of the stem and the bonnet. In one form of the sealing assembly a base ring has an upstanding central rim with back-up rings and seal rings are provided on both sides of the rim. A cap is fastened to the upper end of the base ring to preload the seal rings and a communication is provided through the rim between inner and outer seal rings to equalize the pressure between opposite sides of the rim.

An object of the present invention is to provide an improved valve which has an extended useful life when exposed to extremes of pressure, temperature and corrosive conditions.

Another object is to provide an improved stem seal for a valve which maintains its effective seal after multiple pressure and temperature cycles and movements of the valve stem.

A further object of the present invention is to provide an improved stem seal for a valve which is readily installed, is preloaded and is pressure responsive to increase the sealing loads with increases in pressure.

BRIEF DESCRIPTION OF THE DRAWINGS

These and other objects and advantages of the present invention are hereinafter set forth and described with respect to the drawings wherein.

DESCRIPTION OF THE PREFERRED EMBODIMENTS

Figure 1:
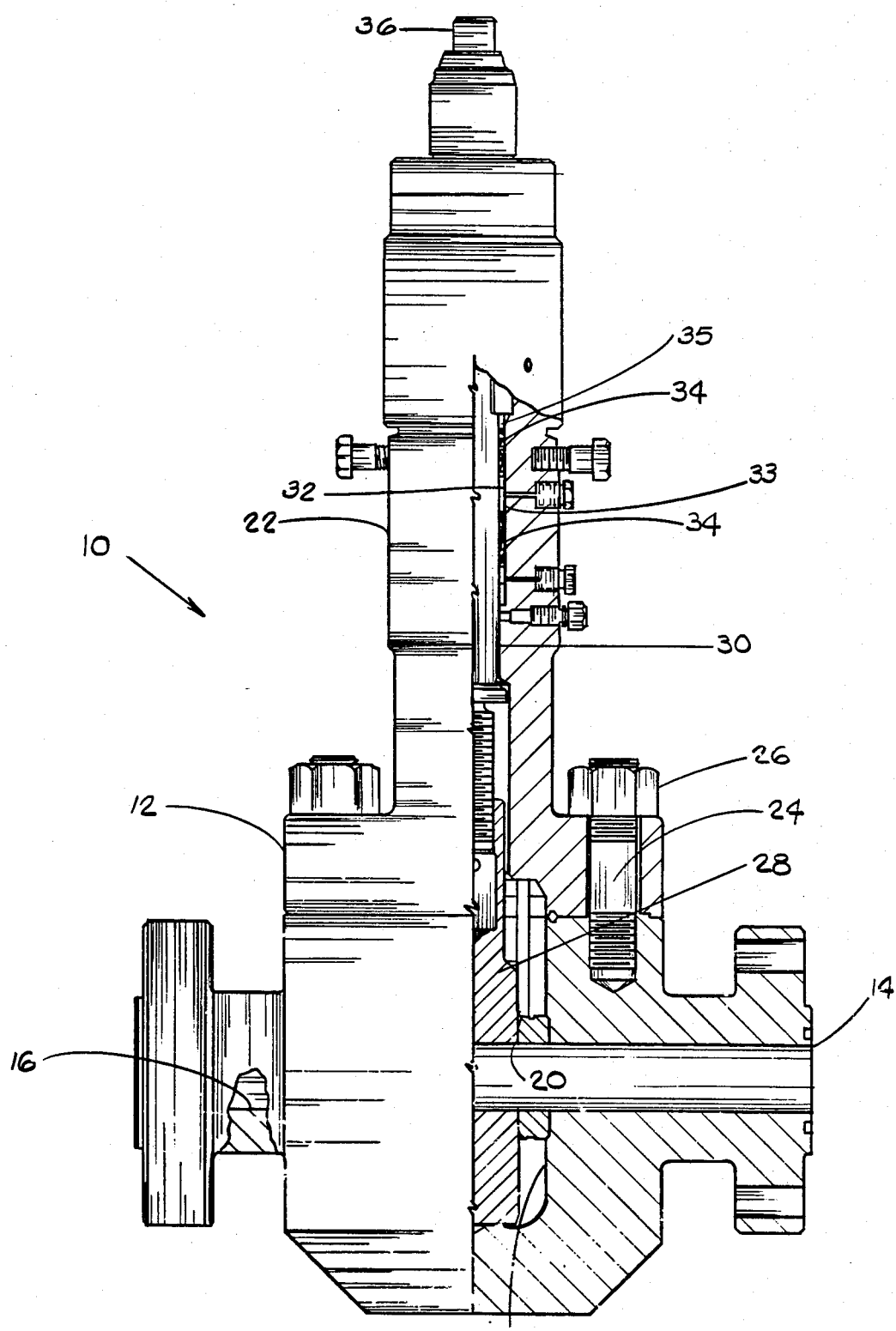
FIG. 1 is an elevation view of the improved valve of the present invention with portions broken away to illustrate the components of the valve.

Valve 10 shown in FIG. 1 is a gate valve suitable for use in oil and gas well lines, in geothermal well lines, and in other corrosive, high temperature, high pressure, stem moving and pressure and temperature cycle applications. Valve 10 includes body 12 having inlet 14, outlet 16, valve chamber 18 and valve seat 20. Bonnet 22 is secured to body 12 by studs 24 and nuts 26 as shown and covers the opening of valve chamber 18 on the upper side of body 12. Valve member 28 (which in FIG. 1 is a sliding gate) is positioned within valve chamber 18 and slides in coaction between valve seat 20 and the outlet valve seat (not shown) to control flow through valve 10. Stem 30 is threaded into the upper end of valve member 28 and extends through bore 32 in bonnet 22 and stem sealing assemblies 34 are provided to seal between the exterior surface of stem 30 and the interior surface of bore 32. Lantern ring 33 is positioned between sealing assemblies 34 and metal ring 35 is positioned above upper seal assembly 34 to ensure that sealing assemblies 34 are located at their desired positions along stem 30.

While stem 30 is shown to be a rotating type of valve stem with suitable flats 36 on its portion extending beyond bonnet 22 the improved sealing assemblies of the present invention are suitable also for sealing around a reciprocating stem. The flats 36 provide the means for rotating stem 30 to move valve member 28 between opened and closed positions. Any suitable actuator may be used for this movement.

Figure 2:
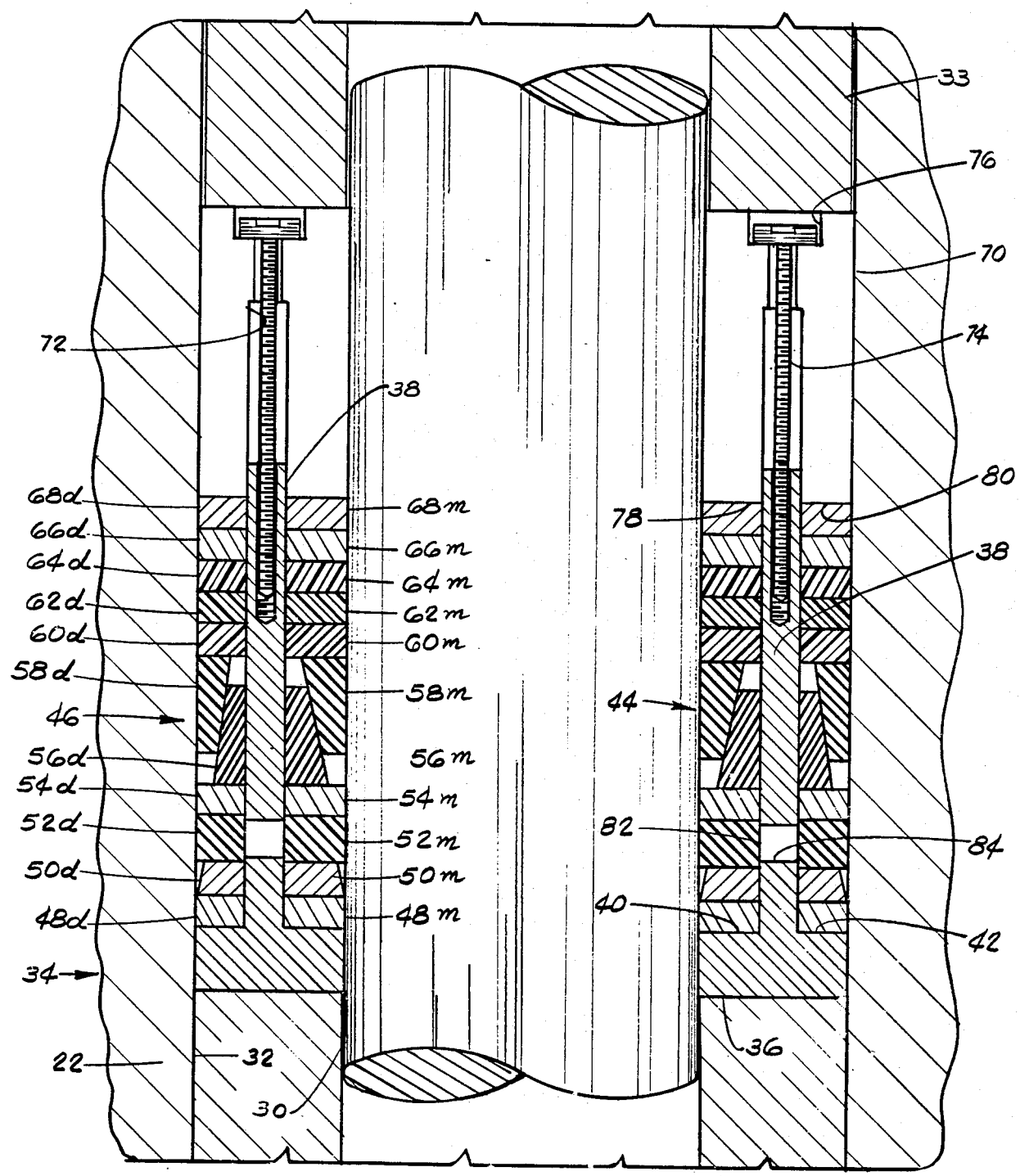
FIG. 2 is a sectional view of one of the improved stem sealing assemblies.
Figure 3:
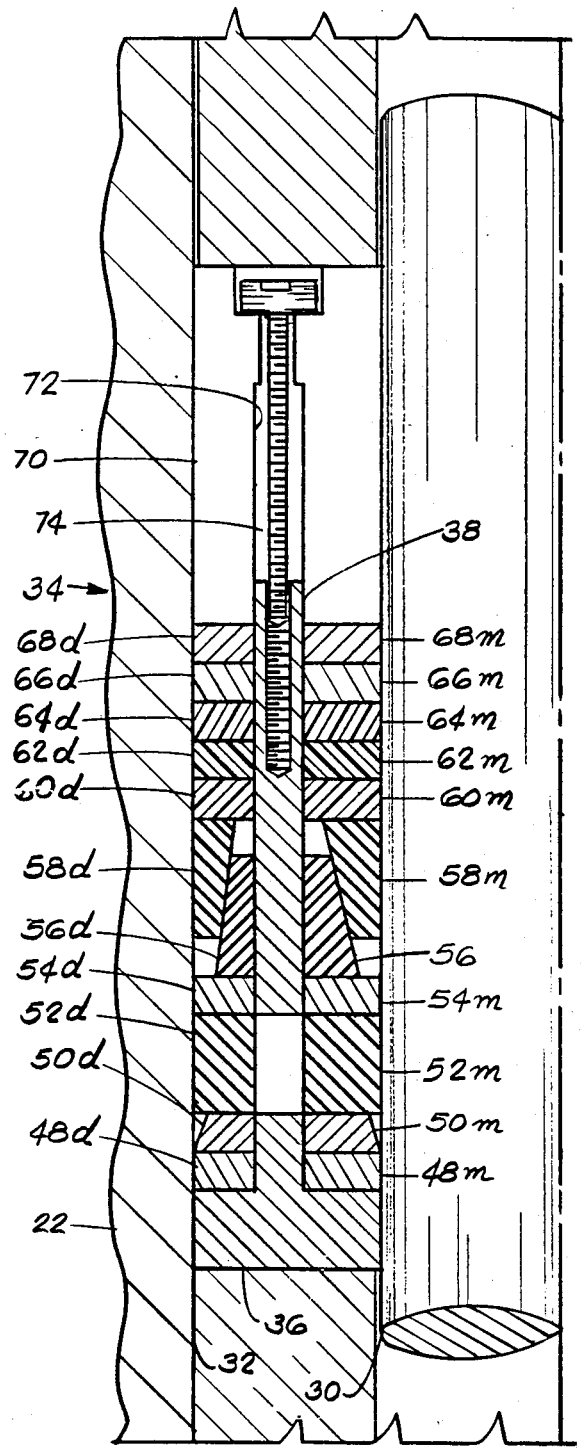
FIG. 3 is a half sectional view of the details of the preferred stem sealing assembly in its preloaded installed position.
Figure 4:
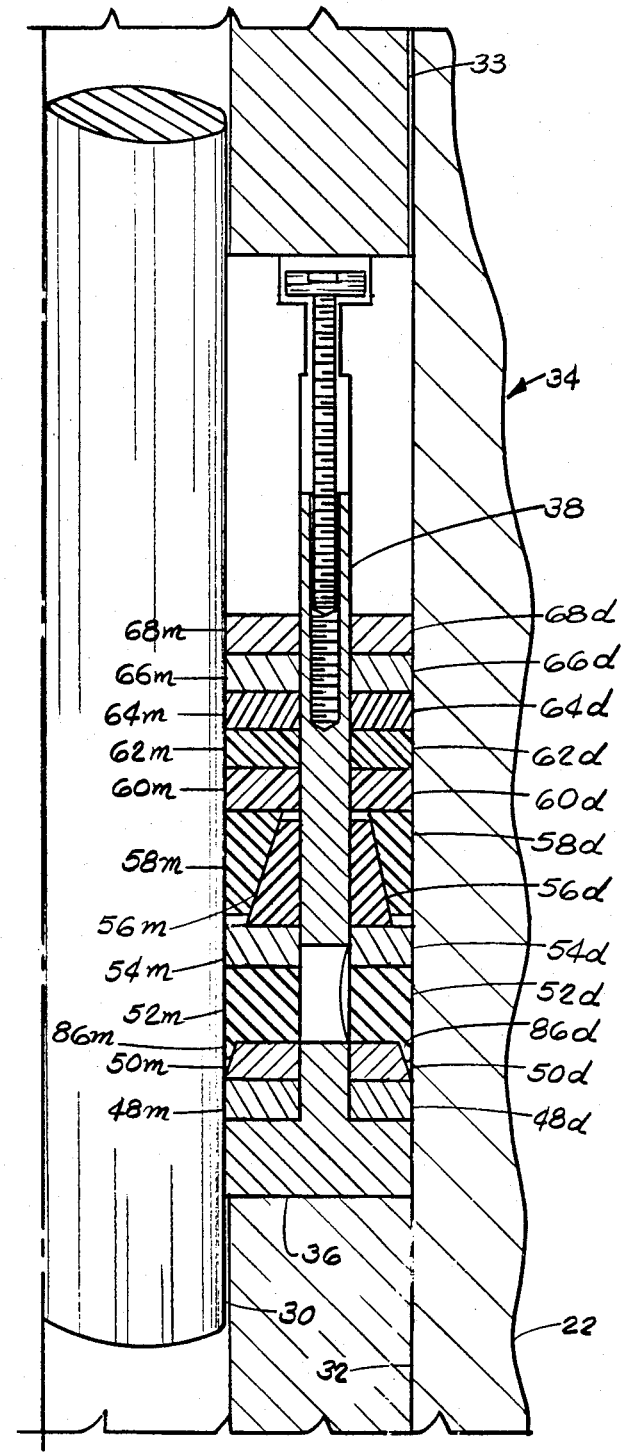
FIG. 4 is a similar half sectional view of the other side of the preferred stem sealing assembly showing the relative position of its components when it is exposed to pressure.

Sealing assembly 34 is shown in detail in FIGS. 2, 3 and 4. It includes base ring 36 having upstanding rim 38 extending axially therefrom approximately midway between the inner and outer peripheries of base ring 36 to provide inner shoulder 40 and outer shoulder 42. It is preferred that rim 38 be positioned so that the areas of shoulders 40 and 42 are substantially equal. An inner stack 44 of rings is mounted on shoulder 40 and an outer stack 46 of rings is mounted on shoulder 42 with the corresponding ring in each stack being substantially the same exception as noted below and except their above noted differences in radial dimensions. To simplify the description of sealing assembly 34 the corresponding rings have been assigned the same numbers with the suffix "m" to designate an inner or medial ring and the suffix "d" to designate an outer or distal ring. Stacks 44 and 46 each include back-up ring 48, forming ring 50, sealing ring 52, back-up ring 54, wedge ring 56, tapered seal ring 58 and back-up rings 60, 62, 64, 66 and 68 which have progressively increasing modulus of elasticity in the direction away from base ring 36. Ring 50m has an inner tapered opening facing seal ring 52m and ring 50d has an outer tapered opening facing seal ring 52d. The openings provided by rings 50 may be tapered as shown or parallel to the axis of stem 30. Rings 58m and 58d engage rings 56m and 56d along their tapered surfaces which are at an angle to their axes of substantially less than 45° so that when loaded axially they are wedged radially into sealing engagement. Cap ring 70 includes annular recess 72 to receive the upper end of rim 38 and is secured to rim 38 by cap screws 74 which have their heads in recesses 76 in the upper surface of cap ring 70 as shown. Cap ring 70, thus, provides inner loading ring 78 which engages stack 44 and outer loading ring 80 which engages stack 46 so that cap screws 74 may be used to preload sealing assembly 34. Preloading of sealing assemblies 34 may not be desired and a slight interference fit of a back-up ring can be used to prevent downward movement of the assemblies 34. Further a slight interference of a plastic insert between rim 38 and recess 72 can be utilized to retain cap 70 in its desired position with respect to rim 38. Sealing assemblies 34 are supported in the annulus between stem 30 and the bore 32 of bonnet 22 by the friction of stacks 44 and 46 thereon and by lantern ring 33 and ring 35 and when exposed to pressure the radial sealing forces increase.

The preferred materials of sealing assembly 34 are as follows: base ring 36, cap ring 70, forming rings 50 and back-up rings 68 are a high strength, high modulus steel or nickel alloy (such as 4130, 410, X750 or A286); back-up rings 48, 54 and 66 are a beryllium copper alloy (C17200) or titanium, 6% aluminum, 4% vanadium alloy to provide a high strength medium modulus, wear and gall resistant material; sealing rings 52, wedge rings 56 and tapered seal ring 58d are an unfilled polytetrafluoroethylene; tapered seal ring 58m is a carbon filled polytetrafluoroethylene; back-up rings 60 are a perfluoroalkoxy tetrafluoroethylene with 5% polytetrafluoroethylene; back-up ring 62m is an oriented polytetrafluoroethylene with 20% poly p-oxybenzoyl aromatic polyester (such as the material made by Kennecott Corp. and sold under the trademark Ekonol); back-up ring 62d is a polyphenelene sulfide filled with carbon fibers (such as the material sold by International Polymer Corp. under the Trademark IPC 1836); and back-up rings 64 are a low strength, low modulus metal alloy such as copper, aluminum nickel alloy (sold by Ampco Metal Company under the trademark Ampcoloy 570).

When loaded it is desirable to have a pressure communication between stacks 44 and 46. This communication is provided by plugs 82 of unfilled polytetrafluoroethylene positioned in ports 84 which extend through rim 38 adjacent sealing rings 52.

The operation of sealing assembly 34 can best be seen by comparing FIGS. 3 and 4. FIG. 3 illustrates the preloaded, installed condition of sealing assembly 34 and FIG. 4 illustrates the pressure loaded condition of sealing assembly 34. The initial loading provided by cap screws 74 causes the rings of each stack to be in tight engagement on their inner and outer surfaces with the adjacent surfaces of bonnet bore 32, stem 30 and inner and outer surfaces of rim 38.

When pressure is applied it is exerted across the underside of base ring 36. Since there is no resistance to upward movement of base ring 36 in the area above rim 38 this pressure differential creates a greater radial pressure engagement by the stacks 44 and 46 with the surfaces against which they seal. The pressure loading thus increases the sealing forces on the stacks and portions of seal rings 52m and 52d are extruded into the tapered openings provided by forming rings 50m and 50d to form extruded lips 86m and 86d which extend in the direction toward the pressure. Also wedge rings 56 and tapered seal rings 58 are forced axially toward each other and the small angle of their tapered engaging surfaces wedges them radially to provide an enhanced radial sealing force. Back-up rings 60 through 68 have increasing modulus of elasticity in the direction away from the pressure and this provides radial sealing pressure decreasing in the direction away from the pressure loading.

Figures 5, 6:
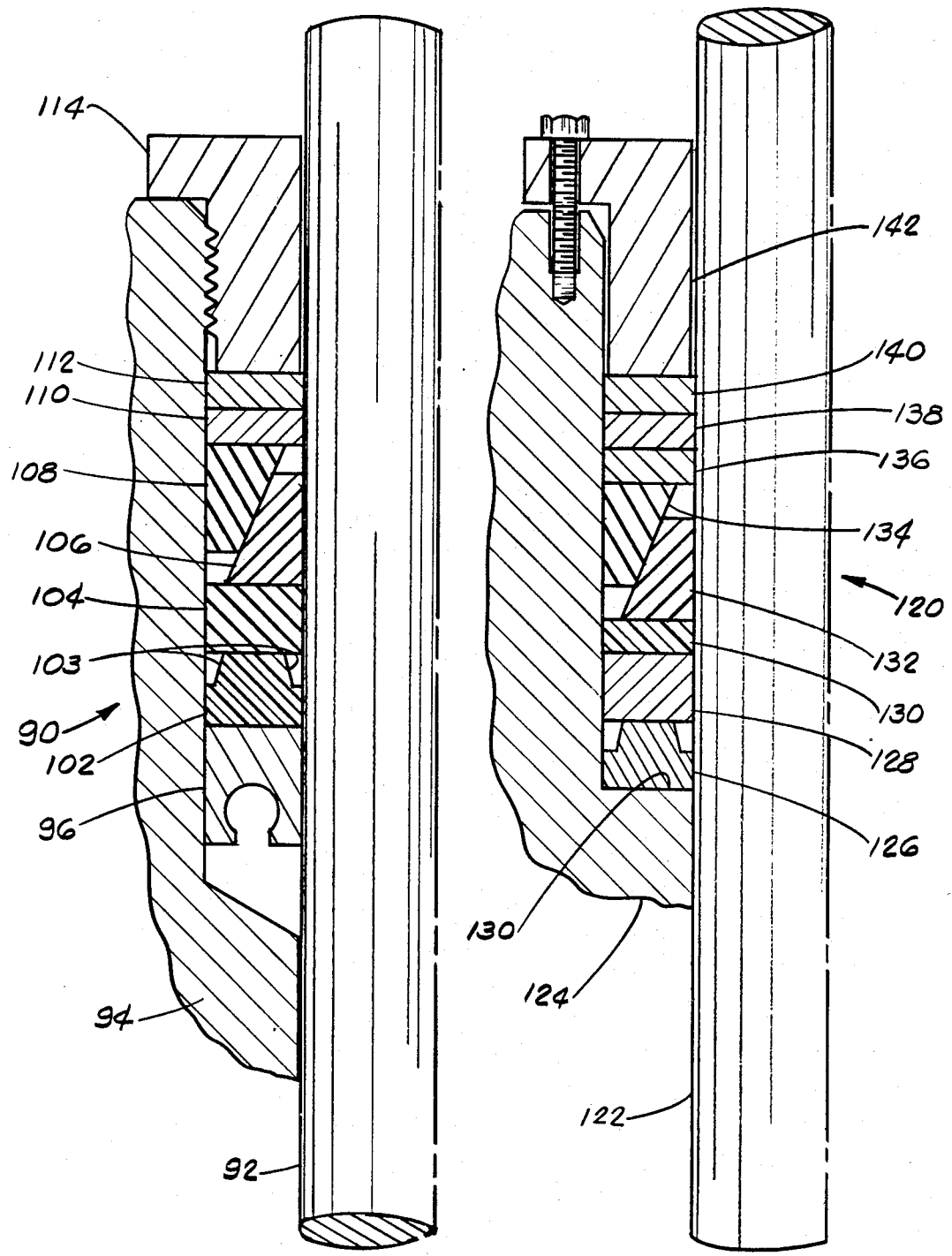
FIG. 5 is a partial sectional view of a modified form of stem sealing assembly.
FIG. 6 is a partial sectional view of another modified form of stem sealing assembly.

A modified form of sealing assembly 90 is shown in FIG. 5. Seal assembly 90 is positioned around stem 92 and within bonnet 94. Polymeric seal ring 96 has a lower annular opening 98 forming lips 100 which provide an initial seal. Forming ring 102 engages ring 96 and has inner and outer tapered recesses 103 facing seal ring 104. Tapered seal rings 106 and 108 are above seal ring 104 and back-up rings 110 and 112 are above seal ring 108 and are engaged by annular loading ring 114 which is threaded into the bore of bonnet 94. Seal rings 96, 104, 106 and 108 are preferred to be unfilled polytetrafluoroethylene or other suitable extrudable material. Seal ring 104 when preloaded and subjected to pressure loading extrudes into the tapered recesses of forming ring 102 to form sealing lips (not shown) extending toward and sealing responsive to the pressure to which seal assembly 90 is exposed.

Another modified form of seal is sealing assembly 120 shown in FIG. 6 for sealing between stem 122 and the interior of bonnet 124. Sealing assembly 120 includes forming ring 126 having inner and outer tapered recesses facing seal ring 128 and seated on internal shoulder 130 of bonnet 124. Back-up ring 130 is positioned between seal ring 128 and tapered seal ring 132. Tapered seal ring 134 engages ring 132 along their mutual tapered surfaces at a slight angle as shown. Back-up rings 136, 138 and 140 having decreasing modulus of elasticity are positioned on seal ring 134. Loading ring 142 engages upper back-up ring 140 and suitable means, such as bolts 144, is provided to preload seal assembly 120. As with sealing assembly 90, sealing rings 128, 132 and 134 are preferred to be unfilled polytetrafluoroethylene or other suitable extrudable material. With such material the sealing lips are formed in the recesses of forming ring 126 responsive to pressure and the sealing surfaces of such rings easily conform to any irregularities in the surfaces against which they are to seal to provide an improved seal.

What is claimed is:
1. A valve comprising
  a body having an inlet, an outlet, a valve chamber, and a valve seat surrounding communication between said inlet and said outlet, a valve member positioned within said valve chamber, a valve stem extending through said body and connected to said valve member, a bonnet surrounding said valve stem, means for moving said valve stem to move said valve member toward and away from said valve seat to control flow therethrough, a seal ring of extrudable material positioned between said stem and said body, rings positioned on opposite sides of said sealing ring between said valve stem and said body, means adjacent said seal ring providing a recess opening toward the pressure side of said seal ring, a base ring having an annular upstanding rim with inner and outer shoulders at the base of said rim, said seal ring and said other rings forming a first stack positioned on the interior of said rim on said inner shoulder, a second stack of a seal ring and rings similar to the rings on said inner shoulder positioned in the exterior of said rim on said outer shoulder, means adjacent said seal ring of said second stack providing a recess opening toward the pressure side of said seal ring, means engaging said rim and said stacks independent of said body and stem for preloading said stacks of rings upon installation to obtain an initial pressure seal between said stem and said bonnet and said seal rings extruding into their respective recess to provide sealing lips in such recesses when pressure is within said bonnet to provide a more effective seal between said stem and said bonnet when the stacks are responsive to interior bonnet pressure.

2. A valve according to claim 1 wherein said preloading means includes an annular cap ring having a central annular recess, said cap ring positioned on said stack of rings with said rim in said recess, and means for tightening said cap to said base ring through an opening in said rim to load said stacks of rings.

3. A valve according to claim 1 wherein said preloading means includes a loading ring engaging the side of one of said rings away from pressure, and means independent of said body and said stem for moving said loading ring in a direction to load said rings.

4. A valve comprising a body having an inlet, an outlet, a valve chamber and a valve seat, a valve member in said valve chamber, a valve stem extending through said body and connecting to said valve member, means for moving said valve stem to move said valve member to control flow through said body, means around said stem for sealing between said stem and said body, said sealing means including a base ring positioned between said stem and said body and having an annular base and an upstanding rim extending from the central portion of said base, a first stack of seal rings and back-up rings positioned on said base and within said rim and adjacent said stem, a second stack of seal rings and back-up rings positioned on said base and about said rim and adjacent said bonnet, means engaging said rim and said stacks for preloading said stacks upon installation to obtain an initial pressure seal between said stem and said bonnet, each of said stacks including upper and lower back-up rings, and a first and second seal rings positioned between said back-up rings, said first and second seal rings having mating engaging surfaces which both taper at an angle substantially less than 45 degrees with respect to the axis of said stem which coact when pressure is within said body to provide a more effective seal between said stem and said bonnet when the stacks are responsive to interior valve body pressure.

5. A valve according to claim 4 including means establishing communication through a cavity in said rim between the seal rings of said stacks for transmitting a radial sealing force between said seal rings during the preloading of said stacks.

6. A valve according to claim 6 including a third seal ring, means providing a recess facing the pressure side of said third seal ring adjacent a surface against which said third seal ring is to seal, the material of said third seal ring being sufficiently extrudable so that when exposed to pressure it extrudes to form a lip sealing against pressure.

7. In a valve having a movable stem extending through a bonnet, a sealing assembly for sealing between the stem and the bonnet comprising a base ring positioned between said stem and said body and having an annular base and an upstanding rim extending from the central portion of said base, a first stack of seal rings and back-up rings positioned on said base and within said rim and adjacent said stem, a second stack of seal rings and back-up rings positioned on said base about said rim and adjacent said bonnet, means for preloading said stacks upon installation to obtain an initial pressure seal between said stem and said bonnet, each of said stacks including upper and lower back-up rings, and a first and second seal rings positioned between said back-up rings, said first and second seal rings having mating engaging surfaces which both taper at an angle substantially less than 45 degrees with respect to the axis of said stem which coact when pressure is within said bonnet to provide a more effective seal between said stem and said bonnet when the stacks are responsive to interior bonnet pressure.

8. A sealing assembly according to claim 7 wherein the material of said seal rings is unfilled polytetrafluoroethylene.

9. A sealing assembly according to claim 7 wherein at least one of said seal ring stacks includes seal rings with their modulus of elasticity increasing in the direction away from the pressure against which seal rings are to seal.

10. A valve comprising a body having an inlet, an outlet, a valve chamber and a valve seat, a valve member in said valve chamber, a valve stem extending through said body and connecting to said valve member, means for moving said valve stem to move said valve member to control flow through said body, means around said stem and for sealing between said stem and said body, said sealing means including a base ring positioned between said stem and said body and having an annular base and an upstanding rim extending from the central portion of said base, a first stack of seal rings and back-up rings positioned on said base and within said rim, a second stack of seal rings and back-up rings positioned on said base and about said rim and adjacent said bonnet, means for preloading said stacks upon installation to obtain an initial pressure seal between said stem and said bonnet, each of said stacks including upper and lower back-up rings, a first and second seal rings positioned between said back-up rings, said first and second seal rings having tapered engaging surfaces at an angle substantially less than 45 degrees with respect to the axis of said stem which coact when the pressure is within said body to provide a more effective seal between said stem and said bonnet when the stacks are responsive to interior valve body pressure, and pressure equalizing means establishing communication through said rim between the seal rings of said stacks to ensure substantially the same pressure loading of said seal rings in both stacks.

11. A valve according to claim 10 wherein said pressure equalizing means includes an extrudable material positioned in said rim.

12. In a valve having a movable stem extending through a bonnet, a sealing assembly for sealing between the stem and the bonnet comprising a base ring positioned between said stem and said body and having an annular base and an upstanding rim extending from the central portion of said base, a first stack of seal rings and back-up rings positioned on said base and within said rim and adjacent said stem, a second stack of seal rings and back-up rings positioned on said base and about said rim and adjacent said bonnet, means for preloading said stacks upon installation to obtain an initial pressure seal between said stem and said bonnet, each of said stacks including upper and lower back-up rings, a first and second seal rings positioned between said back-up rings, said first and second seal rings having mating engaging surfaces which both taper at an angle substantially less than 45 degrees with respect to the axis of said stem, a pressure equalizing port through said rim adjacent said seal rings, and an extrudable material in said port for transmitting pressure loads between seal rings of said first and second stacks when pressure is within said bonnet to provide a more effective seal between the stem and the bonnet when the stacks are responsive to interior bonnet pressure.

* * * * *